Aug. 23, 1927.

G. D. SUNDSTRAND

LATHE

Filed Nov. 17, 1922

1,639,756

5 Sheets-Sheet 2

Aug. 23, 1927.

G. D. SUNDSTRAND

LATHE

Filed Nov. 17, 1922

1,639,756

5 Sheets-Sheet 4

Inventor
G. D. Sundstrand

Aug. 23, 1927.
G. D. SUNDSTRAND
LATHE
Filed Nov. 17, 1922
1,639,756
5 Sheets-Sheet 5
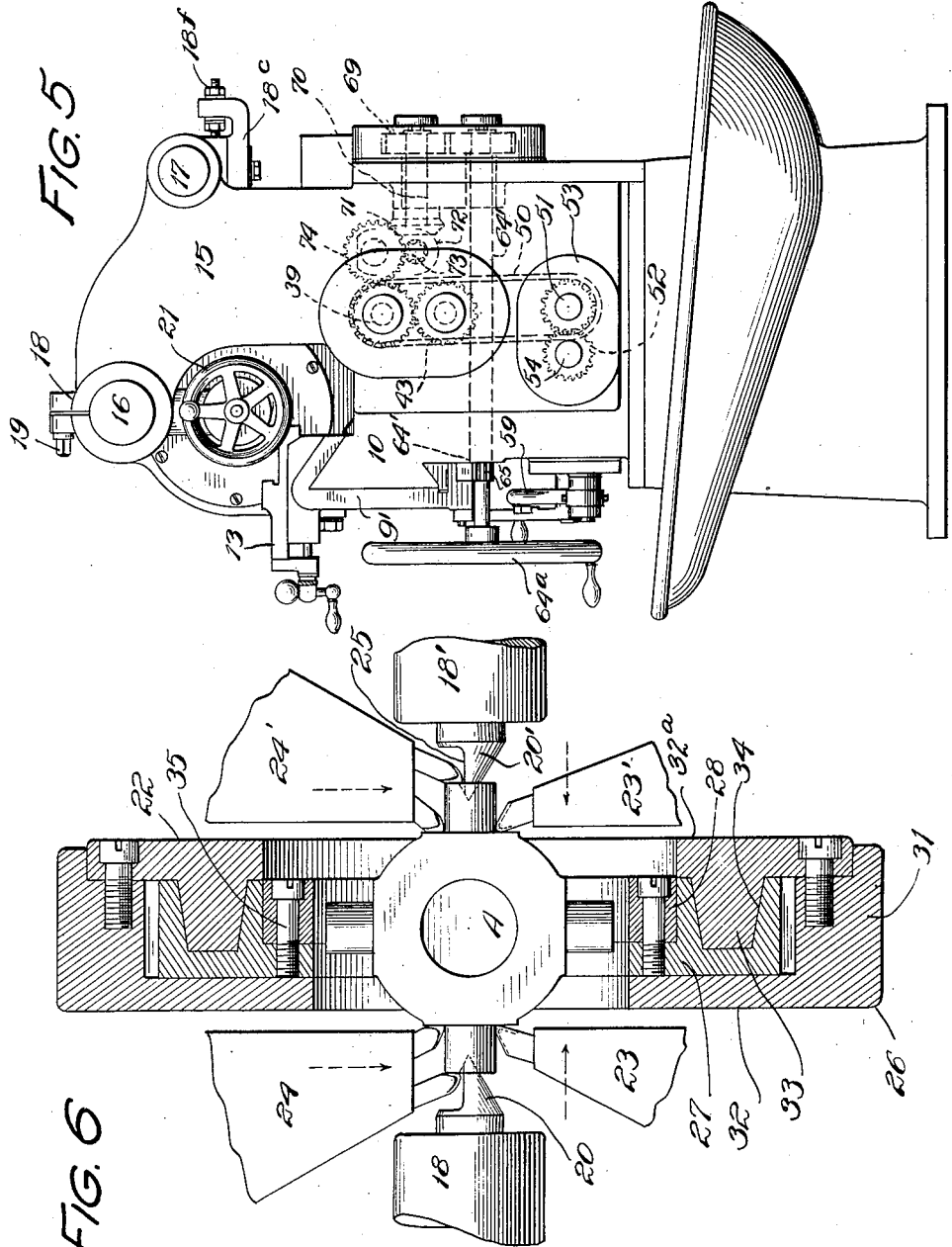

Patented Aug. 23, 1927.

1,639,756

UNITED STATES PATENT OFFICE.

GUSTAF DAVID SUNDSTRAND, OF ROCKFORD, ILLINOIS, ASSIGNOR, BY MESNE ASSIGNMENTS, TO SUNDSTRAND MACHINE TOOL CO., OF ROCKFORD, ILLINOIS, A CORPORATION OF ILLINOIS.

LATHE.

Application filed November 17, 1922. Serial No. 601,469.

The invention relates to a lathe adapted for use in the manufacture of parts having a plurality of portions requiring separate machining and customarily produced in large quantities.

It is desirable, in order to enable the manufacture of such parts on an efficient basis, to increase the number of operations which may be performed simultaneously, thus reducing to a minimum the handling time, and otherwise to facilitate the machining operation.

The primary object of my invention is to produce a lathe of a thoroughly practical character which is capable of operating upon two or more portions thereof simultaneously.

A further object is to produce a lathe in which the work supporting stocks are effectually mounted above and in spaced relation to the lathe bed, leaving the latter free for use in supporting the tool carriages.

An important object of the invention is to provide a lathe construction of ample strength and rigidity to withstand the extraordinary strain to which the work and the tool supports are subjected because of the large number of operations performed at the same time.

The objects of the invention thus generally stated, together with other and ancillary advantages, are attained by the construction and arrangement shown in the accompanying drawings forming part hereof. While only one embodiment of the invention has been illustrated, it is contemplated that various changes in the form, construction and arrangement of the parts may be made by those skilled in the art without departing from the spirit and scope of the invention as expressed in the appended claims.

Figure 1:
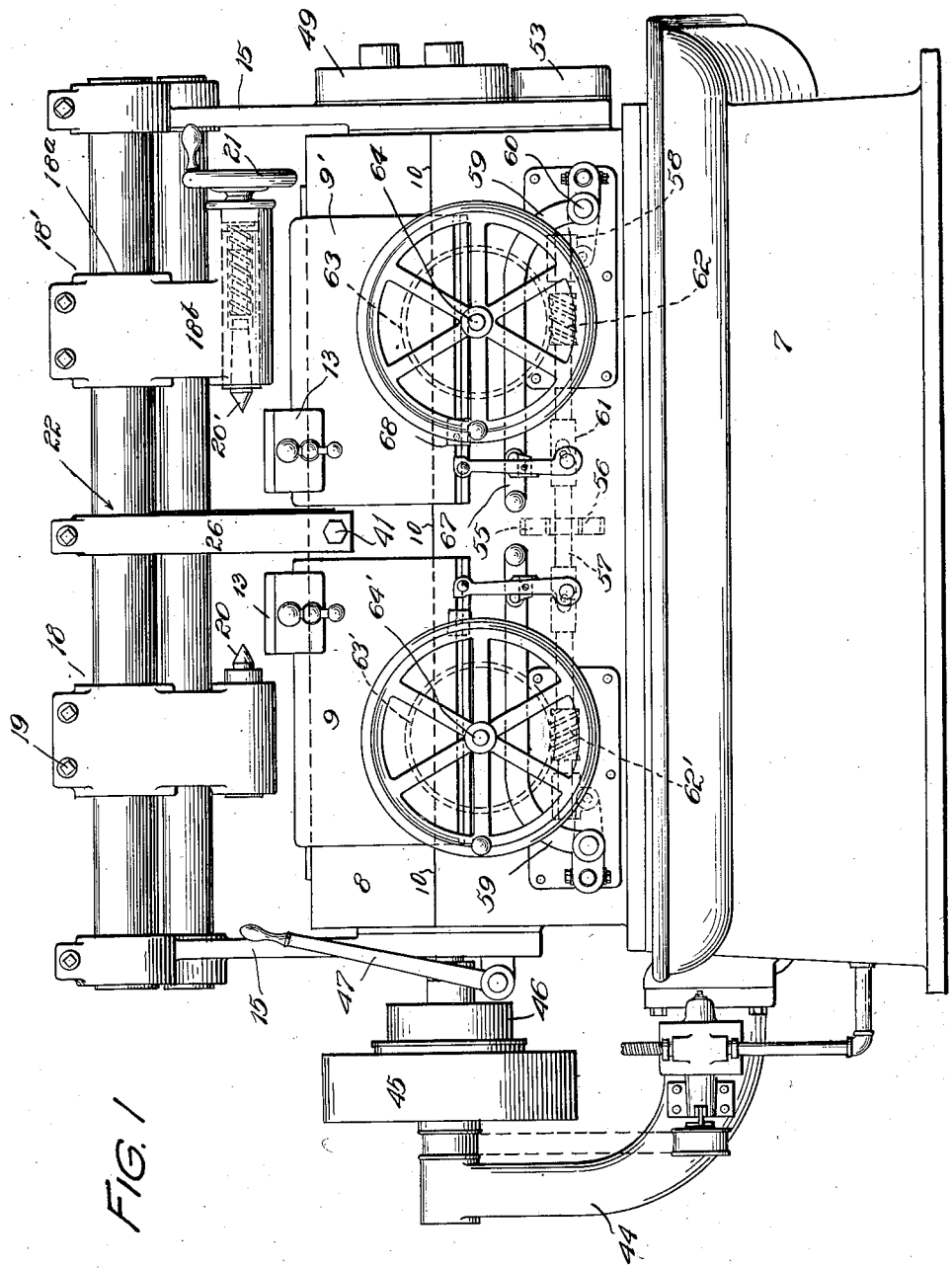
Figure 2:
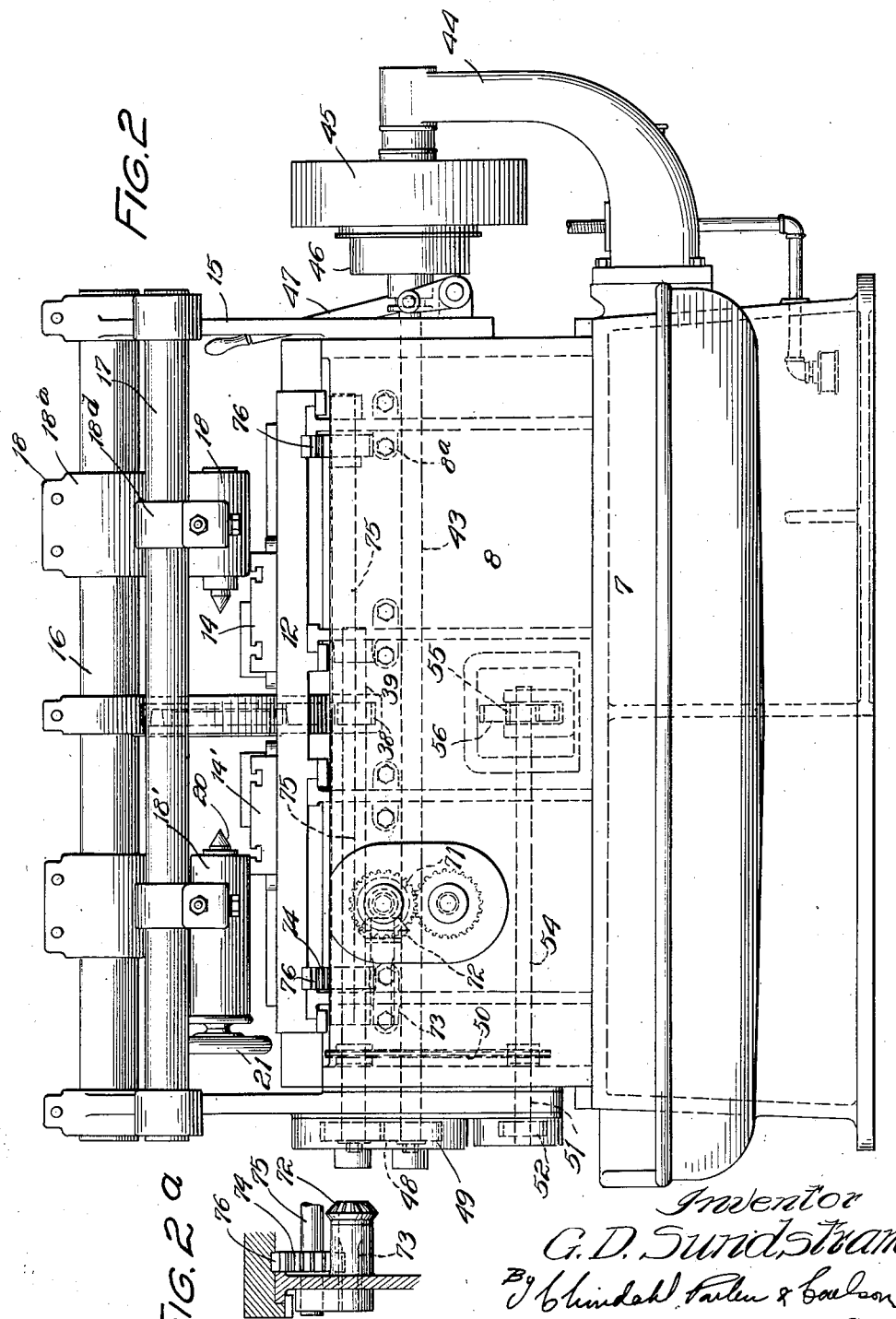
Figure 3:
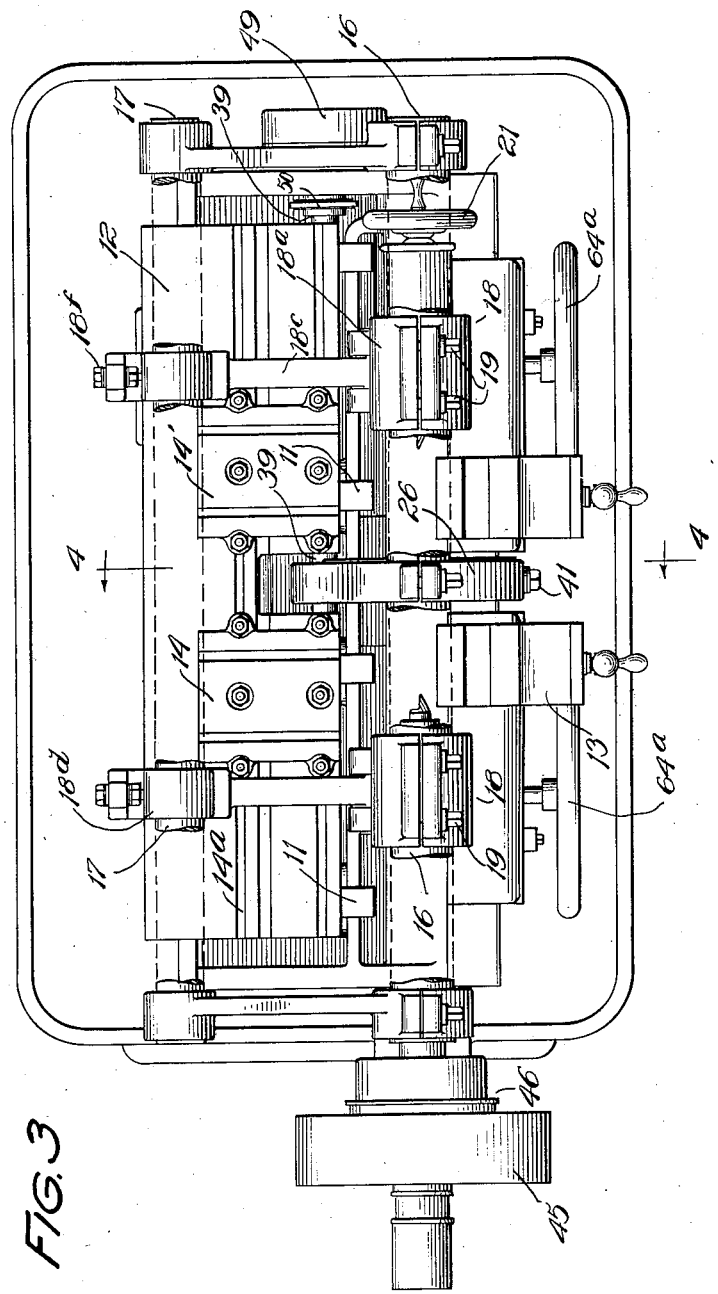
Figure 4:
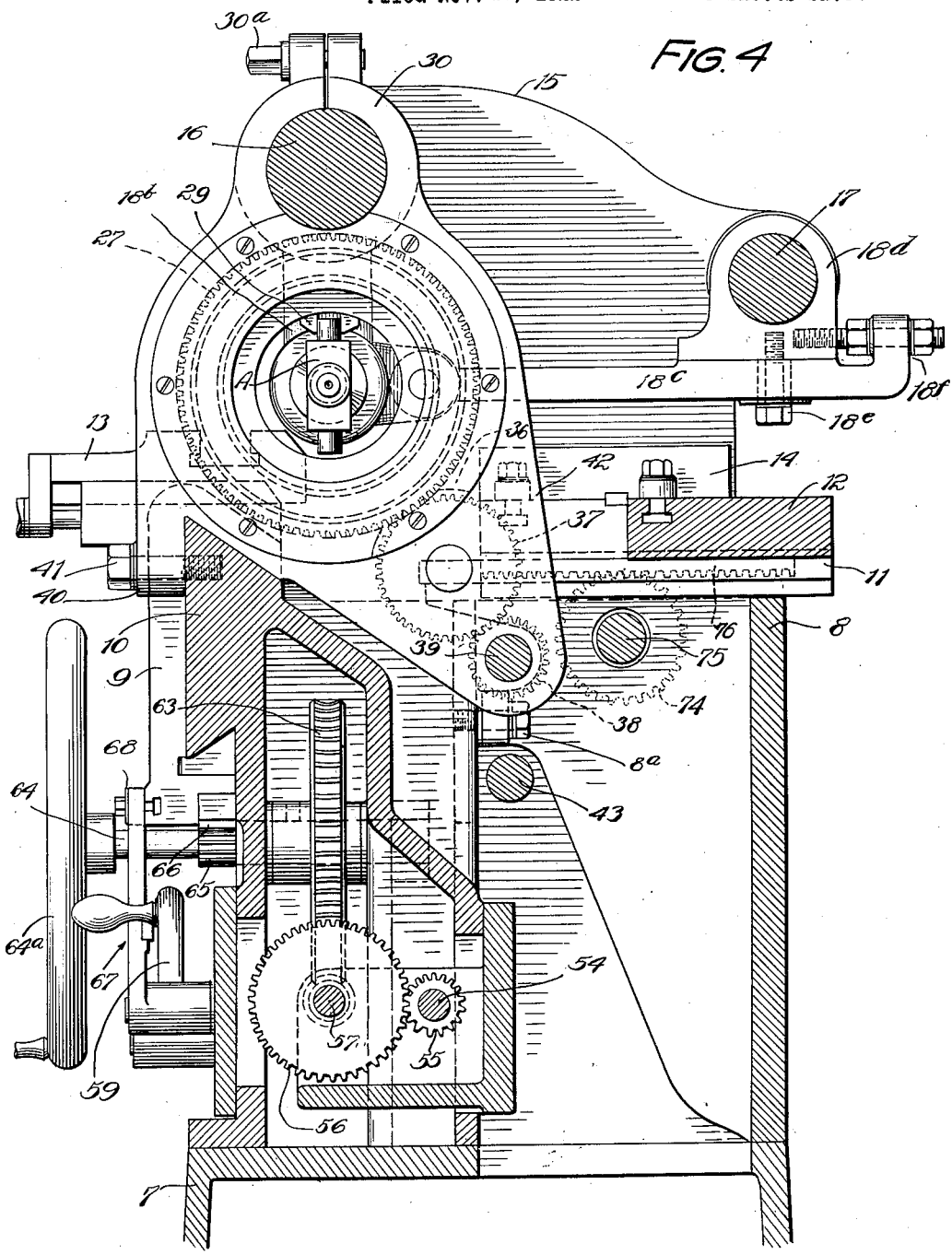

Figure 1 of the drawings is a front elevational view of a lathe constructed in accordance with my invention. Fig. 2 is a rear side elevational view of a lathe. Fig. 2ª is a fragmentary sectional view showing a detail of construction. Fig. 3 is a fragmentary top plan view. Fig. 4 is a central vertical sectional view taken approximately in the plane of line 4—4 of Fig. 3. Fig. 5 is an end elevational view. Fig. 6 is an enlarged fragmentary horizontal section taken through the work holding and driving means and illustrating the several operations which may be performed simultaneously upon a knuckle-joint cross.

It will be obvious that the invention is adapted for wide and varied usage. For purposes of illustration I have selected a knuckle-joint cross as the work to be machined.

The construction which I have produced preferably comprises a base 7 having mounted thereon a bed 8 of hollow construction so as to enclose the major portion of the gearing and associated driving connections. Mounted for movement longitudinally of the bed is a pair of front tool carriages 9 and 9' slidable on ways 10. Mounted upon transverse ways 11 is a rear tool carriage 12. Each of the carriages 9 and 9' has mounted thereon a transversely adjustable tool block 13, and the carriage 12 may be provided with one or more tool blocks 14 and 14', two being herein shown. While the tool blocks 14 and 14' are herein shown as mounted for movement upon a single support, it is to be understood that this construction may readily be varied to provide for the independent movements of the tool slides. These blocks are mounted for longitudinal adjustment in grooves 14ª formed in the carriage.

While the particular construction of the bed shown is not essential, it preferably is made in two sections, a front section and a rear section each of which is provided with upright partitions or braces which braces are connected together by means of bolts 8ª (Fig. 4). The front section carries the front tool carriages and the rear section is arranged so as slidably to support the rear tool carriage.

A pair of standards 15 rise from opposite ends of the bed 8, being rigidly secured thereto in any suitable way. These standards carry at their upper ends in the present instance two overarms 16 and 17. The overarm 16 is located approximately centrally over the bed and is of substantial size. The overarm 17, on the other hand, is located somewhat lower and to the rear, and it constitutes a support auxiliary in character to the overarm 16. A pair of tailstocks 18 and 18' are mounted upon these overarms 16 and 17, being provided with suitable clamping screws 19 (Fig. 1). These stocks carry centers 20 and 20', the latter being adjustable by means of a hand wheel 21 and associated parts of well known construction. Preferably the centers are made laterally adjustable. To this end each of the stocks comprises a head portion 18ª mounted upon the overarm (Figs. 1 and 4), and having a depending arm 18ᵇ carrying the center at its lower end. Pivotally connected with this arm is a laterally adjustable arm 18ᶜ adjustably connected to a head 18ᵈ on the overarm 17, by a screw 18ᵉ and having an adjusting screw 18ᶠ engaging in the head 18ᵈ.

Referring now to Fig. 6, the work indicated by the letter A is mounted for rotation in a work holder and driver 22. A pair of tool holders 23 and 23' mounted upon the tool blocks 13 of the front carriages, carry tools adapted to turn a pair of trunnions constituting the opposite end portions of the work. Tools carried by holders 24 and 24' mounted upon the blocks 14 and 14' of the rear carriage are adapted to face the opposite ends of the trunnions and also the opposite sides of the block. To enable the tools to face the opposite ends of the trunnions the centers 20 and 21 are cut away upon their rear sides as shown at 25, Fig. 6, it being understood that initially the ends of the work are recessed to receive the centers, preparatory to being mounted in the lathe.

The work holding and driving means 22 is supported from the overarm 16 and comprises a casing 26 within which is mounted a toothed ring 27 and a work holding ring 28 equipped with suitable dogs 29. These, in the present instance, are adapted to engage the two trunnions which are not being operated upon. The casing 26 has at its upper end a split bearing 30 provided with a clamping screw 30ª by means of which it is fastened upon the overarm 16. Said casing comprises a peripheral wall 31 and two opposed side walls 32 and 32ª centrally apertured to receive the work. The wall 32ª is in the form of a removable plate and has formed upon its inner face an annular rib 33 and the ring 27 is provided with a groove 34 adapted to receive said rib. It will be observed that the rib thus constitutes a bearing serving to center the ring within the casing. The ring 28 may be secured in position by means of screws 35.

Within the lower portion of the casing is mounted a spur gear 37 meshing with the toothed ring 27. Said gear is driven by means of a pinion 38 fast upon a shaft 39 extending longitudinally of the machine (Fig. 2). Said shaft 39 in turn is arranged to be driven in a manner to be presently described.

The casing 26 has a forward depending portion 40 overlying the way 10 for the front tool carriages and adapted to be secured thereto as by means of a bolt 41. Also, the casing has a rearwardly and downwardly depending portion 42 through which the shaft 39 extends. The work holding means is thus firmly and securely mounted above the bed.

Any suitable means may be employed for actuating the work holding means so as to rotate the work, and for feeding the tools relative thereto. The means which I have herein employed comprises preferably a main drive shaft 43 journaled in the bed and extending longitudinally therethrough. One end of the shaft extends beyond the bed and is supported in a bracket 44. A pulley wheel 45 loose upon the shaft is adapted to be connected thereto by means of a clutch device 46 operated by a hand lever 47. The opposite end of the shaft 43 is connected, by means of gearing 48 enclosed within a gear box 49, to the shaft 39 which extends parallel thereto and a short distance above the shaft 43. The shaft 39, it will be remembered, carries the pinion 38 which operates to drive the gears 37 and 27 and thereby rotate the work holding ring 28.

The shaft 39 is connected by a chain and sprocket 50 with a stub shaft 51 journaled in the lower portion of the bed 8 (Fig. 2) at one end thereof. A gear train 52 enclosed within a housing 53 (Fig. 5) connects the shaft 51 with a parallel shaft 54 immediately forwardly of the shaft 51. The shaft 54 (Figs. 2 and 4) terminates approximately centrally of the bed and at its inner end carries a pinion 55 meshing with a gear 56 fast upon a shaft 57 (Figs. 1 and 4.) This shaft 57 is journaled at its opposite ends in bearing members 58 mounted for pivotal movement with arms 59 mounted upon pivots 60. To this end the shaft is of sectional construction, provided with universal coupling members 61 which permit up and down movements of the bearings 58 and hence of worms 62 and 62' fast upon the shaft 57. These worms 62 and 62' are oppositely constructed, so that in meshing with worm wheels 63 and 63' shafts 64 and 64' with which said wheels are rigid, are rotated in opposite directions. Fast upon each of said shafts 64 and 64' is a pinion 65 meshing with a rack 66 rigid with each of the tool carriages 9 and 9'. It will thus be seen that rotation of the feed shaft 57 will impart movement to the front tool carriages in opposite directions. Hand wheels 64ª fast upon the forward ends of the shafts 64—64' enable the manual operation of the feeding means. Normally the arms 59 are supported by latch devices 67 with their respective worms in mesh with the corresponding worm wheels. Said latch devices are, however, adapted to be tripped automatically in the movements of the carriages as by means of stop members 68 engaging with the latch devices so as to permit the arms 59 to fall, thus disengaging the feed worms from ther worm wheels.

For a more detailed description of the automatic stop means for controlling the feeding of the tool carriage, reference is made to my copending application Ser. No. 591,038 filed September 27, 1922.

The rear tool carriage 12 is also arranged to be actuated by the feed shaft 57 and hence is under the control of the automatic stop devices just described. Referring now to Figs. 4 and 5, the shaft 64 of the feed mechanism of the carriage 9' extends rearwardly of the bed for connection by means of gearing 69 with a stub shaft 70 carrying at its inner end a bevel pinion 71. Said pinion meshes with a similar pinion 72 (Figs. 2 and 2ª) having rigid therewith a spur pinion 73 which meshes with a pinion 74 fast upon a longitudinally extending shaft 75. Said pinion 74 is arranged to mesh with racks 76 upon the underside of the carriage 12 near the opposite ends thereof, so as to move it bodily transversely of the bed and thus carry the tool holders 24 and 24' into and out of engagement with the work A.

It will be observed that the lathe which I have produced embodies a construction such as to lend substantial strength and rigidity thereto. The double overarm feature provides means independent of the bed for supporting the tailstocks, thus leaving the space of the bed free for use in supporting the tool carriages. Moreover, the tailstocks as well as the work holding and driving means are mounted with sufficient firmness to eliminate vibrations. It will also be observed that the construction enables an exceedingly compact arrangement.

I do not wish to be understood as limiting the invention to the use of two front carriages and one rear carriage, for it will be obvious that any desired number of carriages may be employed, and that they may be actuated by feed mechanism in any suitable or preferred manner depending upon the nature of the work to be performed.

I claim as my invention:

1. A lathe having a bed, an overarm rigidly supported above the bed near the forward edge thereof, a front tool carriage mounted upon the forward side of the bed, a rear tool carriage mounted upon the upper side of the bed, a pair of tail stocks suspended from the overarm above and in spaced relation to said carriages, and means also supported by the overarm and secured to the bed for engaging the work between its ends to rotate it.

2. A lathe having a bed, front and rear tool carriages, an overarm rigidly supported above the bed, means carried by the overarm for supporting opposite ends of the work, means engaging the work between its ends to drive it, and means supported by the bed at the rear side thereof for holding said work supporting means against lateral movement.

3. A lathe having a bed, front and rear tool carriages, an overarm rigidly supported above the bed, means carried by the overarm for supporting opposite ends of the work, means engaging the work between its ends to drive it, and means supported by the bed at the rear side thereof for holding said work supporting means against lateral movement, the last mentioned means comprising a second overarm rigidly supported above the bed near the rear side thereof.

4. A lathe having a bed, front and rear tool carriages mounted on the bed, means for rotatably supporting the opposite ends of the work, means for engaging the work between its ends to rotate it, and means for mounting said work supporting means above and in spaced relation to said tool carriages comprising an overarm rigidly supported above the bed near the forward side thereof.

5. A lathe having a bed, a tool carriage mounted for movement upon the bed, means for supporting the work at its opposite ends above the bed, and means for rotating the work comprising a casing having a central opening therein to receive the work and means adapted to engage and clamp the work between its ends, a horizontally disposed longitudinally extending shaft within the bed, and a part depending from said casing and mounted on said shaft.

6. A lathe having a bed, tool carriages mounted for movement upon the bed, means for supporting the work at its opposite ends above the bed, and means for rotating the work comprising a casing having a central opening therein to receive the work and means adapted to engage and clamp the work between its ends, a horizontally disposed longitudinally extending shaft within the bed, a part depending from said casing and mounted on said shaft, and means for securing the casing to the bed.

7. A lathe having a bed, a tool carriage mounted on the bed, means for rotatably supporting the work including a casing having an opening therethrough, an overarm carried by the bed and having said casing suspended therefrom, means carried by the casing adapted to clamp and engage the work to rotate it, and means for driving the last mentioned means comprising a shaft journaled within the bed and extending longitudinally thereof, said casing having a depending part mounted on said shaft.

8. A lathe having a bed, a tool carriage mounted on the bed, means for rotatably supporting the work including a casing having an opening therethrough, an overarm carried by the bed and having said casing suspended therefrom, means carried by the casing adapted to clamp and engage the work to rotate it, a shaft mounted within the bed and extending longitudinally thereof, said casing having a depending part mounted on said shaft.

9. A lathe having a bed, means for rotatably supporting the work near the forward side of the bed comprising a pair of tail stocks, means for supporting the tail stocks above and in spaced relation to the bed, and means for holding said tail stocks against lateral movement comprising an overarm rigidly supported above the bed at the rear side thereof and connected with said tail stocks.

10. A lathe having a bed, a pair of standards rising from opposite ends of the bed, a pair of overarms supported at their opposite ends in said standards and spaced apart transversely of the bed, and work supporting means suspended from the front overarm and rigidly connected to the rear overarm.

11. A lathe having a bed, a pair of standards rising from opposite ends of the bed, a pair of overarms supported at their opposite ends in said standards and spaced apart transversely of the bed, and work supporting means suspended from the front overarm and rigidly connected to the rear overarm, said rear overarm being supported at a height somewhat less than the front overarm.

12. A lathe having a bed, a pair of standards rigid with the opposite ends of the bed and rising therefrom, a front overarm carried by the upper ends of said standards, a rear overarm also carried by said standards, means for supporting a piece of work at its opposite ends, and center drive means secured to both of said overarms and to the bed.

13. A lathe having a bed, a pair of standards rigid with the opposite ends of the bed and rising therefrom, a front overarm carried by the upper ends of said standards, a rear overarm also carried by said standards, means for supporting a piece of work at its opposite ends, and center drive means secured to both of said overarms and to the bed, said work supporting means being also secured to said overarms so as to be supported thereby above the bed.

14. A lathe having a pair of standards at its opposite ends, an overarm supported at its opposite ends by said standards, work holding means suspended from said overarm, and a second overarm carried by said standards with which said work holding means is also connected.

15. A lathe having a pair of standards at its opposite ends, an overarm supported at its opposite ends by said standards, work holding means suspended from said overarm, and a second overarm carried by said standards with which said work holding means is also connected, said work holding means having a center drive device which is also secured to the bed.

16. A lathe having a bed, a pair of standards rigid with opposite ends of the bed, front and rear overarms carried by said standards, work supporting means secured to said overarms so as to be supported thereby above and in spaced relation to the bed, and front and rear tool carriages mounted on the bed for movement in the space between the work supporting means and the bed.

17. A lathe having a bed, work holding means supported above and in spaced relation to the bed and adapted to support the work at its opposite ends, center drive means secured to the bed substantially centrally thereof and adapted to engage with the work between its ends to rotate it, and tool supports mounted for movement beneath said work holding means on opposite sides of said center drive means.

18. A lathe having a bed, means for rotatably supporting the work above the bed including a casing having a part rigid therewith and depending into the bed, a pair of parallel shafts journaled within the bed, said depending part being mounted on one of said shafts, means connected with the last mentioned shaft and enclosed within said depending part of the casing for driving the work holding means, a tool support mounted for movement on the bed and having a gearing connection with the other one of said shafts, and means for rotating said shafts.

19. A lathe having a bed, means for rotatably supporting the work above the bed including a casing having a part rigid therewith and depending into the bed, a shaft journalled in the bed, said depending part being mounted on said shaft, and means connected with the shaft and enclosed within said depending part for driving the work support.

20. A lathe having a bed, an overarm rigidly supported above the bed, and a work holder supported by the overarm and secured to the bed.

21. A lathe having a bed and an overarm rigidly supported above the bed, a work holder supported by the overarm and including a driven gear, and means for driving said gear including a shaft journaled in the bed and having an operative connection with the gear.

22. A lathe having an overarm providing a rigid elevated support, a work holder having a casing mounted upon the overarm, a gear in said casing, and a work-holding device rigid with said gear.

23. A lathe having a stationary overarm providing a rigid elevated support, a casing suspended from said overarm, a gear enclosed within the casing, and a work-clamping device carried by the gear.

24. In a lathe, the combination of a pair of parallel shafts, a casing having portions mounted upon said shafts and opposed side plates centrally apertured to receive the work, and a ring journaled in the casing and having devices for clamping the work for rotation therewith.

25. In a lathe, the combination with a pair of centers, of means for rotatably supporting a piece of work between said centers, said means comprising an overarm an annular casing having at its upper side a clamping member adapted to be rigidly secured to the overarm having opposed side walls centrally apertured, a ring journaled on one of said walls, means carried by said ring for engaging the work between its ends, and means for rotating the ring.

26. The combination in a lathe of a pair of centers, of means for rotatably supporting a piece of work between said centers comprising a stationary casing having a peripheral wall, a side wall rigid with said annular wall, an opposed side wall detachably secured to the annular wall, a ring rotatably secured within the casing by the detachable side wall, and work-holding means carried by the ring.

27. A lathe having a bed, a pair of overarms mounted above the bed, a plurality of tailstocks on said overarms, and work-holding means supported by one of the overarms and the bed.

28. A lathe having a bed, a pair of standards at opposite ends of the bed, an overarm carried by said standards, and work-holding means connecting said overarm with the bed and adapted to rotate the work.

29. A lathe having a bed, a standard rising from one end of the bed, an overarm rigid with said standard, and work-holding means connecting the overarm and the bed and adapted to rotate the work.

30. A lathe having a pair of overarms, and a work support carried by said overarms and adjustable to vary the position of the support laterally of the lathe bed.

31. A lathe having an overarm, a tailstock comprising a head mounted on the overarm and a center-carrying arm depending from the head, and means for adjustably swinging said arm to vary the position of the center laterally of the lathe.

32. A lathe having an overarm, a tailstock comprising a head mounted on the overarm and a center-carrying arm depending from the head, and means for adjustably swinging said arm to vary the position of the center laterally of the lathe comprising a second head mounted at one side of the center, and an adjusting member pivotally connected with said arm and adjustably secured to the second head.

33. A lathe having a bed, means for rotatably supporting the work between its ends above the bed, a pair of front tool carriages mounted for longitudinal movement on the forward side of the bed and having tool supports located on opposite sides of the work, a pair of rear tool carriages mounted on the upper side of the bed for transverse movement and also having tool supports located on opposite sides of the work, a driven shaft having an operative connection with the work to rotate it and operative connections with the rear tool carriages to feed them in the same direction, a second driven shaft operatively connected with the front tool carriages, and means operatively connecting said second shaft with the front tool carriages to feed them longitudinally in opposite directions.

In testimony whereof, I have hereunto affixed my signature.

GUSTAF DAVID SUNDSTRAND.